(12) United States Patent
Brun

(10) Patent No.: US 7,386,550 B2
(45) Date of Patent: Jun. 10, 2008

(54) DOCUMENT ANONYMIZATION APPARATUS AND METHOD

(75) Inventor: Caroline Brun, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 344 days.

(21) Appl. No.: 11/202,549

(22) Filed: Aug. 12, 2005

(65) Prior Publication Data

US 2007/0038437 A1 Feb. 15, 2007

(51) Int. Cl.
*G06F 17/00* (2006.01)
(52) U.S. Cl. ..................... 707/9; 707/104.1
(58) Field of Classification Search ............... 707/9, 707/104.1
See application file for complete search history.

(56) References Cited

U.S. PATENT DOCUMENTS

| | | | |
|---|---|---|---|
| 7,206,848 B1 * | 4/2007 | Zara et al. ........... | 709/229 |
| 2002/0091516 A1 * | 7/2002 | Matsuoka et al. ...... | 704/231 |
| 2005/0234968 A1 * | 10/2005 | Arumainayagam et al. . | 707/102 |

OTHER PUBLICATIONS

Steven P. Abney, "Parsing by Chunks," Bell Communications Research, pp. 1-18, Nov. 10, 1994.
Ait-Mokhtar et al., "Incremental Finite-State Parsing," Proc. Of Applied Natural Language Processing, 1997, Washington D.C. Apr. 1997.
Air-Mokhtar et al., "Robustness beyond Shallowness: Incremental Deep Parsing," Natural Language Engineering, 8 (2/3): 121-144, (2002).
Bikel et al., "Algorithm that Learns What's in a Name," Mach Learn. vol. 24, No. 1, pp. 211-231 (1999).
Hagege et al., "Entre syntaxe et semantique: Normalisation . . . ," TALN, Betz-sur-Mer4, 11-14, (2003).
Brun et al., "Intertwining Deep Syntactic Processing and Named Entity Detection," Proc. of ESTAL, Alicante, Spain, (2004).
Plamondon et al., "Anonymisation de decisions de justice," TALN, Fes, 19-21 (2004).
Sweeney, "Replacing Personally-Identifying Information in Medical Records, the Scrub System," Journal of the American Medical Informatics Assoc., 333-337 (1996).
Ruch et al, "Medical Document Anonymization with a Semantic Lexicon," Proc. AMIA, 729-33, (2000).
Yu et al., "Description of the Kent Ridge Digital Labs System . . . ," Proc. 7th Message Understanding Conf. (MUC-7), Fairfax, vA Apr. 29-May 1, 1998.
Krupka et al, "Description of the NetOwl™. . . ," Proc. 7th Message Understanding Conf. (MUC-7), Fairfax, VA Apr. 29-May 1, 1998.

(Continued)

*Primary Examiner*—Joon H Hwang
(74) *Attorney, Agent, or Firm*—Fay Sharpe LLP

(57) ABSTRACT

Named entities in a document are identified. Each named entity is classified as either anonymous or public based on analysis including at least syntactic analysis of one or more portions of the document containing the named entity. In one suitable approach, each named person entity is classified by default as anonymous, and each named entity that is not a named person is classified by default as public. Named entities are selectively re-classified based on evidence contained in the document indicating that the default classification is incorrect. The classification of a named entity as either anonymous or public is propagated to multiple occurrences of that named entity in the document Those named entities classified as anonymous are anonymized.

22 Claims, 3 Drawing Sheets

OTHER PUBLICATIONS

Black et al., "Facile: Description of the NE System . . . ," Proc. 7th Message Understanding Conf. (MUC-7), Fairfax, VA Apr. 29-May 1, 1998.

Giguet, Emmanuel (1998) Ph.D. Thesis, "A Method for Automatic Parsing of Formal Strucutres . . . ," Universite de Caen, Dec. 1998.

* cited by examiner

Superior Court of Justice

Judge: The Honourable Justice Deborah K. Smith.

Heard: March 31st, April 1st and April 2nd, 2004, in Halifax, Nova Scotia.

Between:

Heather Stern and Stephen Stern, Plaintiffs. John Legge for the Plaintiffs.

and:

Simon Schonblum, Beth Starkman, Shawna Starkman and James Starkman, Defendants.
Michael Kestenberg for the Defendant Simon Schonblum.
Kevin W. Fisher for the Defendants Beth Starkman, Shawna Starkman and James Starkman.

The defendants, Simon Schonblum, Beth Starkman, Shawna Starkman and James Starkman moved for summary judgment dismissing the claims against them in a statement of claim issued pursuant to an order giving directions dated December 17, 2001.
The litigation concern the estate of Samuel Stern who died on September 25, 2001 aged 97 years. On October 30, 2001, a certificate of appointment of estate trustee with a will dated August 26, 1999 was granted to Mr. Stern's niece, Ruth Fruitman, in accordance with the terms of the will.

Samuel Stern's spouse, Ann, died in 1996. At her death she was the registered owner of the matrimonial home at 33 Barclay Road, Toronto. Samuel Stern continued to live there after her death and, on April 26, 1998, it was transferred into his name.
...
On November 10, 1998, Samuel Stern executed a deed transferring his residence at 33 Barclay Road into his and Rochelle Stern's joint names.

In, or about, 1990, Samuel Stern had appointed John Goodman as his attorney for personal care. M Goodman never had control over his financial affairs but was aware of them.
...

*FIG. 2*

Superior Court of Justice

Judge: The Honourable Justice Deborah K. Smith.

Heard: March 31st, April 1st and April 2nd, 2004, in Halifax, Nova Scotia.

Between:

<PERS_ANONYM>Heather Stern</PERS_ANONYM> and <PERS_ANONYM>Stephen Stern</PERS_ANONYM>, Plaintiffs. John Legge for the Plaintiffs.

and:

<PERS_ANONYM>Simon Schonblum</PERS_ANONYM>, <PERS_ANONYM>Beth Starkman</PERS_ANONYM>, <PERS_ANONYM>Shawna Starkman</PERS_ANONYM> and <PERS_ANONYM>James Starkman</PERS_ANONYM>, Defendants.
Michael Kestenberg for the Defendant <PERS_ANONYM>Simon Schonblum</PERS_ANONYM>.
Kevin W. Fisher for the Defendants <PERS_ANONYM>Beth Starkman</PERS_ANONYM>, <PERS_ANONYM>Shawna Starkman</PERS_ANONYM> and <PERS_ANONYM>James Starkman</PERS_ANONYM>

The defendants, <PERS_ANONYM>Simon Schonblum</PERS_ANONYM>, <PERS_ANONYM>Beth Starkman</PERS_ANONYM>, <PERS_ANONYM>Shawna Starkman</PERS_ANONYM> and <PERS_ANONYM>James Starkman</PERS_ANONYM> moved for summary judgment dismissing the claims against them in a statement of claim issued pursuant to an order giving directions dated December 17, 2001. The litigation concern the estate of <PERS_ANONYM>Samuel Stern</PERS_ANONYM> who died on <DATE_ANONYM>September 25, 2001</DATE_ANONYM> aged 97 years. On October 30, 2001, a certificate of appointment of estate trustee with a will dated August 26, 1999 was granted to <PERS_ANONYM>Mr. Stern</PERS_ANONYM>'s niece, <PERS_ANONYM>Ruth Fruitman</PERS_ANONYM>, in accordance with the terms of the will.

<PERS_ANONYM>Samuel Stern</PERS_ANONYM>'s spouse, <PERS_ANONYM>Ann</PERS_ANONYM>, died in <DATE_ANONYM>1996</DATE_ANONYM>. At her death she was the registered owner of the matrimonial home at <ADRESS_ANONYM>33 Barclay Road</ADRESS_ANONYM>, Toronto. <PERS_ANONYM>Samuel Stern</PERS_ANONYM> continued to live there after her death and, on April 26, 1998, it was transferred into his name.
...
On November 10, 1998, <PERS_ANONYM>Samuel Stern</PERS_ANONYM> executed a deed transferring his residence at <ADRESS_ANONYM>33 Barclay Road</ADRESS_ANONYM> into his and <PERS_ANONYM>Rochelle Stern</PERS_ANONYM>'s joint names.

In, or about, 1990, <PERS_ANONYM>Samuel Stern</PERS_ANONYM> had appointed John Goodman as his attorney for personal care. M Goodman never had control over his financial affairs but was aware of them ...

*FIG. 3*

DOCUMENT ANONYMIZATION APPARATUS AND METHOD

BACKGROUND

Document anonymization involves removing personally-identifying information from a document. Typically, a document may be anonymized prior to publication or other widespread dissemination due to legal and/or privacy considerations. For example, medical records may be anonymized before public release to protect the medical privacy of patients. As another example, French law mandates that judicial decisions be anonymized prior to public release.

Document anonymization is a difficult task in part because some personally identifying information may be properly retained, while other personally identifying information should be anonymized. For example, when anonymizing a published judicial decision, information identifying the judge and the lawyers is typically retained, while information identifying clients and witnesses is removed. In the medical area, anonymization may remove information identifying patients while retaining information identifying medical personnel or medical facilities such as hospitals.

Document anonymization is also difficult because of linkages between entities named in a document. For example, a location typically should not be anonymized. However, the location may be contextually associated with a private person in a way which would indirectly identify the person, even with the person's name removed. For example, in the sentence:

In response, John Doe indicated that he would use his authority as mayor of Mayberry to block the new construction project.

the name "John Doe" is an anonymous pseudonym for a real person who is to remain anonymous. However, by retaining the named location "Mayberry" the allegedly anonymized sentence still identifies the person, since the context shows that "John Doe" is the mayor of Mayberry, and the identity of the person holding that position is generally known. Similarly, the retention of dates, locations, titles, numbers, and so forth may, or may not, provide improper cues as to identity, depending upon context.

Heretofore, document anonymization has typically been a manual procedure, due to the context-sensitive nature of the process, the wide range of variables involved in determining whether a particular entity should be removed, and the importance of avoiding inadvertent disclosure of private information. However, manual anonymization is labor-intensive. Publishers of anonymized documents would benefit from methods and apparatuses for providing automated assistance in the anonymization process.

BRIEF DESCRIPTION

According to aspects illustrated herein, there is provided a document anonymization method. Named entities in a document are identified. Each named entity is classified as either anonymous or public based on analysis including at least syntactic analysis of one or more portions of the document containing the named entity. Those named entities classified as anonymous are anonymized.

According to aspects illustrated herein, there is provided a document anonymization processor. A tagger identifies named entities in a document. An anonymity classifier classifies each named entity as either anonymous or public based on analysis of one or more portions of the document containing the named entity. A propagator propagates the classification of a named entity as either anonymous or public to multiple occurrences of that named entity in the document. An anonymized document producer produces an anonymized document corresponding to the document, in which those named entities classified as anonymous are not identified.

According to aspects illustrated herein, there is provided a document anonymization method. Named entities are identified in a document. Each named person entity is classified by default as anonymous. Each named entity that is not a named person is classified by default as public. Named entities are selectively re-classified based on evidence contained in the document indicating that the default classification is incorrect.

BRIEF DESCRIPTION OF THE DRAWINGS

FIG. 2 shows an example legal document to be anonymized.

FIG. 3 shows the output of an example XIP-based document anonymizer for the input document of FIG. 2.

DETAILED DESCRIPTION

Figure 1:
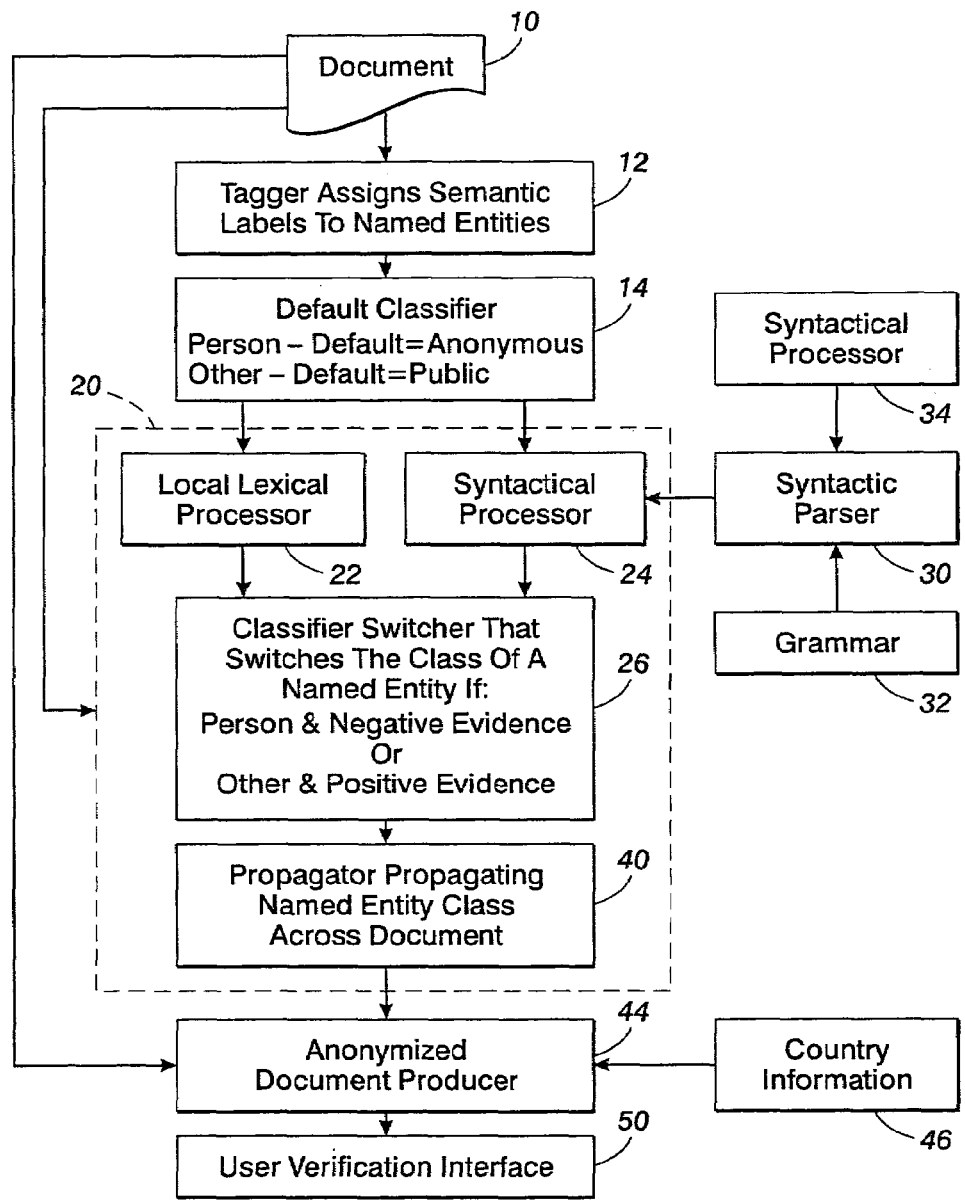
FIG. 1 diagrammatically shows a document anonymization method.

With reference to FIG. 1, a document 10 is to be anonymized. A tagger 12 identifies named entities in the document 10. Typically, the tagger 12 will perform tokenization to identify strings of non-space characters as tokens and to assign semantic labels to tokens identified as named entities. Suitable techniques for tagging named entities are described, for example, in Bikel et al., An Algorithm that Learns What's in a Name, Mach. Learn. vol. 34 no. 1 pp. 211-31 (1999). The tagging can, for example, use XML-type mark-up tags:

The defendants, <PERS>Simon Schonblum</PERS>, <PERS>Beth Starkman</PERS>,<PERS>Shawna Starkman</PERS>, and <PERS>James Starkman</PERS> moved for summary judgment dismissing the claims against them in a statement of claim issued pursuant to an order giving directions dated <DATE>Dec. 17, 2001</DATE>.

where each tag indicated by angle-brackets (< >) is inserted by the tagger 12 and marks off a named entity. The tag pair <PERS></PERS> denotes a named entity corresponding to a person, and the tag pair <DATE></DATE> denotes a named entity corresponding to a date. In some embodiments, the tagger 12 identifies named entities by named entity type, such as: persons; dates; places; addresses and other identifiable locations; personal identification numbers such as social security numbers, bank account numbers, driver's license numbers; and so forth.

A default classifier 14 assigns a default classification to each named entity based on the named entity type. In the illustrated approach, the default classifier 14 assigns a default classification of "anonymous" to each named entity of the person type, and assigns a default classification of "public" to each named entity of other than the person type. Thus, named person entities (which optionally includes named entities of the personal identification number type) are classified "anonymous" by default, while named non-person entities having named entity types such as date, location, and so forth, are classified "public" by default. These defaults are generally appropriate since typically retaining a named person will unambiguously identify that person, whereas retaining a date, location, address, or so forth will not identify a person unless the context indicates otherwise.

However, in some contexts the default classification may be inappropriate. The defaults assigned by the default classifier 14 may be inappropriate, for example, if a named person is someone who should not be made anonymous, such as a doctor in a medical record, or a court official in a legal proceeding record. Similarly, the default "public" classification of a named non-person entity may be inappropriate if retaining that named non-person entity in the anonymized text would indirectly identify a person who should remain anonymous.

Accordingly, a selective re-classifier 20 selectively reclassifies named entities based on local lexical information provided by a local lexical processor 22, and/or based on syntactical information provided by a syntactical processor 24. A classifier switcher 26 selectively re-classifies named entities. If the named entity is a named person, and the lexical or syntactical processing identifies negative evidence indicating that the named person should be public, then the classifier switcher 26 switches the named person entity classification from "anonymous" to "public". Negative evidence appropriate for switching a named person from "anonymous" to "public" may include, for example, association of the named person with a title such as "Judge", "Doctor", or so forth. Similarly, if the named entity is other than a named person, and the lexical or syntactical processing identifies positive evidence indicating that the named entity should be anonymous, then the classifier switcher 26 switches the named non-person entity classification from "public" to "anonymous". Negative evidence appropriate for switching a named non-person entity from "public" to "anonymous" may include, for example, association of a date with terms like "birth date" or "born on" or "died on" which may indicate that the date could identify a person.

The switching of illustrated classifier switcher 26 is an example. In some other embodiments, additional or different switching characteristics may be provided. For example, in some embodiments the named person entities that are made anonymous by default include named entities corresponding to personal identification numbers. In such embodiments, named person entities are selectively re-classified by the classifier switcher 26 based on evidence contained in the document indicating that the default anonymous classification is incorrect. Optionally, the selective re-classifying never re-classifies named person entities corresponding to personal identification numbers. This approach reduces the likelihood of inadvertent public disclosure of social security numbers, credit card numbers, and similar personal identification numbers.

The lexical processor 22 extracts evidence pertaining to whether a named entity should be anonymized based on local information. For example, the lexical processor 22 can detect a named person entity associated with a title, such as "Judge: Jones" or "Doctor Spock". Depending upon the subject matter of the document 10, Such titles can provide negative evidence indicating that the titled named person entity should be classified as "public". However, lexical processing generally cannot detect syntactically deep associations. For example, the lexical processor 22 may be unable to associate Jones with being a judge based on the following sentence:

Jones was the presiding judge.

The syntactical processor 24 performs syntactical analysis, optionally including deep syntactical analysis, which elucidates evidence from grammatically complex associations. In performing the syntactic analysis of the document 10, the syntactical processor 24 suitably employs a syntactic parser 30 that parses a sentence or other aggregation of tokens into phrases, noun parts, verb parts, or other non-terminal parts-of-speech. The parser 30 suitably employs a grammar 32, which in some embodiments is a context-free grammar.

The grammar 32 is optionally augmented by grammar extensions 34. The grammar extensions 34 optionally include extensions which are appropriate to the field of the document 10. For example, if the document 10 is a medical record, the grammar extensions 34 may include medical terminology such as medical terms, medical titles (such as "doctor", "nurse", "specialist", and so forth), medically-related terminology (such as terminology used in the medical insurance field), and so forth. If the document is a legal document, then the grammar extensions 34 may include legal terminology such as "appeal", "docket number", "judge", "attorney", "witness", and so forth. Additionally or alternatively, the grammar extensions 34 optionally include information that is useful for performing anonymization. For example, the grammar extensions 34 may include terms like "born", "died", or so forth that indicate a link between a named date entity and a named person entity. For example, such grammar extensions 34 can enable the syntactical processor 24 to recognize that the sentence:

Louis Frank died on Dec. 30, 2004.

links the date "Dec. 30, 2004" with the named person entity "Louis Frank" in a strongly identifying manner. Accordingly, if "Louis Frank" is to be anonymized, then the date "Dec. 30, 2004" should be anonymized as well. Similarly personally identifying phrases may include "lives at", "lived at", "works at", and so forth. The grammar extensions 34 optionally provide a typology of such concepts and words pertaining to anonymization.

By performing deep syntactical processing, the syntactical processor 24 can elucidate positive and negative evidence that would not be detected by lexical processing alone. For example, lexical processing of the sentence:

Bob Smith is serving as the attorney for the defense.

would not readily recognize Bob Smith as an attorney. However, syntactical processing will generally recognize that this sentence identifies Bob Smith as an attorney, providing negative evidence to support making the named person entity "Bob Smith" public.

The syntactical processor 24 optionally outputs relations between named entities. For example, given the input sentence:

Mrs. Doe was born in Atlanta on 3 Jun. 1980.

The syntactic processor 24 optionally outputs relation information such as:

ATTRIBUTE(born, John Doe)
TIME(born, 3 Jun. 1980)
LOCATION(born, Atlanta)

which provides positive evidence that the date "3 Jun. 1980" and location "Atlanta" should be anonymized. As another example, syntactical analysis by the syntactical processor 24 of the following sentence:

Mister White and Mister Black tendered as experts by the Respondent were not accepted as experts in the field in which they were being proposed.

suitably identifies Mister White and Mister Black as proposed expert witnesses whose names are suitably classified as "public." A purely lexical analysis typically will not associate Mister White and Mister Black with the term "experts" in this sentence.

A suitable deep parsing system for suitable for performing the tagging and lexical-syntactical analysis is the Xerox Incremental Parser (XIP), which is described for example in: Ait-Mokhtar et al., "Robustness beyond Shallowness: Incremental Deep Parsing, in Journal of Natural Language Engineering, Special Issue on Robust Methods in Analysis of Natural Language Data, ed. A. Ballim & V. Pallotta (Cambridge University Press, 2002), which is incorporated herein by reference; and Ait-Mokhtar, Incremental Finite-State Parsing, Proceedings of Applied Natural Language Processing (ANLP-97), Washington, D.C. April 1997, which is also incorporated herein by reference. Other taggers and parsers can be used for these operations.

Once a named entity is classified, including re-classification if appropriate by the classification switcher 26, a propagator 40 propagates the classification to each instance of the named entity in the document 10. This propagation enables positive or negative evidence elucidated by lexical and/or syntactic processing of the context of one instance of a named entity to be used to appropriately classify other instances of the named entity. For example, in a legal document the term "Judge Miller" unambiguously identifies "Miller" as a judge who should be classified "public". Once classified as "public", the "public" classification of the named entity "Miller" is propagated by the propagator 40 throughout the document. If, for example, a later instance reads:

Miller held that the witness is an expert.

the named entity "Miller" in this later instance is also classified as "public" even though the context of this later instance does not indicate that "Miller" should be public. Optionally, the propagation occurs both forward and backward through the document 10 whenever the classification switcher 26 switches the classification of a named entity based on lexical-syntactically elucidated positive or negative evidence. For example, the instance specifying "Judge Miller" may not be the first occurrence of the named entity "Miller", and so backward propagation ensures that earlier instances of "Miller" are appropriately classified as "public".

Propagation can also assist in deciding the classification of other named entities. For example, in the paragraph:

(1) M. Doe called Miss Marple as his witness.
(2) Miss Marple, Vice President of Internal Security Corp., testified that the Respondent reports to her administratively, respecting performance and salary.

Syntactical analysis of the first sentence (1) identifies "Miss Marple" as a person to anonymize, because she is a witness rather than an officer of the court. The classification of "Miss Marple" as "anonymous" is propagated to the second sentence (2). Thus, when the second sentence (2) is analyzed, it is recognized that "Internal Security Corp." should also be anonymized since otherwise the identification of "Vice President of Internal Security Corp." could identify the anonymized named person. The propagator 40 is suitably implemented via storage in a database available during the document anonymization processing. Alternatively, the propagator 40 can be implemented via variable features propagation, such as is implemented in the Xerox XIP deep parsing system.

After processing by the selective re-classifier 20, an anonymized document producer 44 processes the document 10 to anonymize those named entities which are classified "anonymous". For example, each named person entity classified as anonymous can be given a suitable anonymous pseudonym, such as "John Doe."

Optionally, the anonymized document producer 44 accesses a country information database 46 that provides country-specific or locale-specific information for the anonymization. For example, while in the United States "John Doe" is a common anonymous pseudonym, in France "John X" is commonly used as the anonymous pseudonym, and in Canada "J. D." is commonly used. Moreover, the anonymized document producer 44 should use a different anonymous pseudonym for each different anonymized entity. For example, if there are two different anonymous named person entities, one can be replaced by "John Doe" while the other can be replaced by "Jack Fawn". On the other hand, if there are multiple instances of the same named entity that is classified as "anonymous", then the same anonymous pseudonym should be used consistently for all instances of that named entity. Still further, the anonymous pseudonym for named person entities preferably retains gender information, for example using "Jane Doe" instead of "John Doe" for female anonymous named person entities. Where the gender may be ambiguous, an ambiguous anonymous pseudonym is optionally used, such as "Chris Doe" which could be either male or female.

Optionally, the anonymized document output by the anonymized document producer 44 is reviewed by a human reviewer via a user verification interface 50, such as a computer having a display terminal and one or more input devices such as a keyboard, mouse, touch-sensitive screen, or so forth. The interface optionally highlights named entities that have been anonymized using a first type of highlighting, and highlights named entities that have been classified as public (and hence not anonymized) using a second type of highlighting different from the first type of highlighting. For example, retained "public" named entities can be boldfaced, while anonymous pseudonyms can be printed in red. In some embodiments, if the human reviewer chooses to switch the classification of a named entity, the switch is propagated to all instances of that named entity. The hidden identity corresponding to each anonymous pseudonym is optionally provided to the user verification interface 50 so that the anonymous pseudonym can be replaced by the "real" identity if the human reviewer elects to re-classify the anonymous named entity as public. Optionally, the user verification interface 50 provides a way for the human reviewer to see the hidden identity behind an anonymous pseudonym. For example, by hovering a mouse pointer over the anonymous pseudonym, the user verification interface 50 may optionally display the "real" identity to the human reviewer on the display. Once the human reviewer approves the anonymized document, such hidden identity information is optionally removed to keep the document anonymous even in electronic form.

An embodiment of the anonymization processing described herein has been implemented using the Xerox XIP deep parsing system. The named entities tagger 12 was implemented using a named entity recognition approach set forth in Brun & Hagege, Intertwining Deep Syntactic Processing and Named Entity Detection, in Proceedings of ESTAL '04, Alicante, Spain, 2004, which is incorporated herein by reference. The named entities tagger 12 was designed to annotate named entities as one of the following named entity types: percentages (such as 10%, 10 percent, or so forth); dates; temporal expressions (such as days of the week, months, or so forth); monetary expressions; telephone or facsimile numbers; email addresses and URLs; locations;

addresses; personal names; organizational names; events; and legal documents (such as the Maastricht Treaty). As an example, processing of the following sentence:

> Strong U.S. allies Australia and Japan praised Washington's latest moves on Iraq, with Canberra welcoming President Bush's pledge to stay in the country until it is democratic and Tokyo commending moves to seek a U.N. mandate for international troops there.

by the named entities tagger 12 produces the following named entities:

> PERSON(President Bush)
> ORGANIZATION(U.N.)
> LOC_CITY(Canberra)
> LOC_CITY(Tokyo)
> LOC_COUNTRY(U.S.)
> LOC_COUNTRY(Australia)
> LOC_COUNTRY(Japan)
> LOC_COUNTRY(Iraq)

where the capitalized attribute identifies the named entity type. It is contemplated to add additional named entity types, such as personal identification number named entity types and so forth.

Lexical-syntactic analysis, including deep syntactical analysis, was performed using the Xerox XIP parser. The XIP parser labels token relationships with deep syntactic functions, such as linking a verbal or nominal predicate with its deep subject, deep object, and modifiers, or providing general syntactic relations such as SUBJ, OBJ, MODIFIER, or so forth. XIP advantageously labels the normalized syntactic form regardless of the grammatical form of the text. For example, the passive-form sentence:

> The escheat law cannot be enforced .

is parsed by the XIP parser to identify the normalized relationship: OBJ-N(enforce, law).

The anonymization processor components 14, 26, 44 were built onto the XIP parsing system. To facilitate anonymization of example legal documents, the grammar extensions 34 were provided including lexical features such as a "+justice_member" feature that is applicable to nouns like "judge", "attorney", "prosecutor", or so forth, and a "+justice_involved" feature that is applicable to nouns like "plaintiff", "defendant", and so forth. The grammar extensions 34 further included anonymization-facilitating features applicable to verbs like "die", adjectives like "born", or nouns like "spouse", "brother", "sister", or so forth.

With reference to FIG. 2, an example legal document is shown. The legal document of FIG. 2 was processed using the XIP-based anonymization system. The default classifier 14 classified named person entities as "anonymous" by default, and classified named non-person entities as "public" by default. The XIP parser was then applied to determine contextual information based upon which the classifier switcher 26 selectably switched the classification of selected named entities. For example, parsing of the text:

> Judge: The Honourable Justice Deborah K. Smith enabled recognition that the named person entity "Deborah K. Smith" is preceded by a title "Honourable Justice" bearing the feature "+justice_member". Accordingly, the classifier switcher 26 switched "Deborah K. Smith" from its default "anonymous" classification to a "public" classification. Similarly, the text:

> John Legge for the Plaintiffs was analyzed with reference to the grammar extensions 34 to recognize that the named person entity "John Legge" is an attorney, which bears the feature "+justice_member" and again should be switched by the classifier switcher 26 to be classified "public". As yet another example, the document text of FIG. 2 includes:

> In, or about, 1990, Samuel Stern had appointed John Goodman as his attorney for personal care.

Syntactic processing by the XIP parser recognized that "John Goodman" is associated with "attorney" which bears the feature "+justice_member", and hence the classifier switcher 26 switched the classification of "John Goodman" to "public".

The legal document of FIG. 2 further contains the text:

> The litigation concerns the estate of Samuel Stern who died on Sep. 25, 2001 aged 97 years.

which includes a named person entity "Samuel Stern" which was by default "anonymous", and a named date entity "Sep. 25, 2001" which was by default "public". Deep syntactic processing provided no negative evidence to switch the default "anonymous" classification of "Samuel Stem," and so the named person entity "Samuel Stern" remained classified as "anonymous." However, the deep syntactic processing performed by the XIP parsing recognized that the named date entity is associated with the anonymous "Samuel Stem". Accordingly, the named date entity was re-classified as "anonymous" by the classifier switcher 26.

The propagator 40 was implemented using the feature propagation capability of the Xerox XIP parser. For example, propagation enabled the document anonymizer to assign the classification "public" to "John Goodman" in the sentence:

> M Goodman never had control over his financial affairs but was aware of them.

The context of this sentence does not provide a basis for switching the classification of "M Goodman" from "anonymous" to "public". However, by propagating the "public" classification of "John Goodman" determined from the sentence:

> In, or about, 1990, Samuel Stern had appointed John Goodman as his attorney for personal care.

the XIP-based document anonymizer was able to classify "M Goodman" as "public".

FIG. 3 shows in an XML-type tagged format the output of the XIP-based anonymization system applied to the legal document of FIG. 2. Those named person entities that are retained (that is, which are classified as "public") are shown in boldface. Those named entities which are to be anonymized are shown surrounded by suitable mark-up tags such as <PERS_ANONYM> </PERS_ANONYM>, <DATE_ANONYM> </DATE_ANONYM>, or <ADRESS_ANONYM> </ADRESS_ANONYM>. The format shown in FIG. 3 is suitably input to the user verification interface 50 for human review.

While not implemented in the constructed XIP embodiment, optionally the user verification interface 50 employs XML content processing based on the <PERS_ANONYM>, <DATE_ANONYM>, and <ADRESS_ANONYM> XML mark-up tags, such as displaying anonymous pseudonyms in place of content delineated by said mark-up tags, using a different highlighting for the displayed anonymous pseudonyms, and showing the contained hidden identity upon mouse pointer hovering or other selection action by the human reviewer.

It is to be appreciated that the use herein of the classification term "anonymous" is intended as a generic denotation of the classification of a named entity as anonymous, and the use herein of the classification term "public" is intended as a generic denotation of the classification of a named entity as public or not anonymous. Other denotation nomenclatures can be used, such as: "private" and "public"; "confidential" and "open"; or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document anonymization method comprising:
    identifying named entities including named persons in a document;
    classifying each named entity as either anonymous or public based on analysis including at least syntactic analysis of one or more portions of the document containing the named entity, the classifying including classifying each named person by default as anonymous and re-classifying each named person as public only if the analysis indicates that named person is public;
    anonymizing named entities classified as anonymous to generate an anonymized document; and
    at least one of (i) publishing the anonymized document and (ii) displaying the anonymized document for human review.

2. The document anonymization method as set forth in claim 1, wherein the re-classifying as public comprises:
    re-classifying the named person as public if the analysis indicates the named person is associated with one of a group of titles.

3. The document anonymization method as set forth in claim 2, wherein the group of titles includes at least "judge", "attorney", and "lawyer".

4. The document anonymization method as set forth in claim 1, wherein the named entities further include named entities other than named persons, and the classifying further comprises:
    classifying each named entity that is not a named person by default as public; and
    re-classifying each named entity that is not a named person as anonymous only if the analysis indicates that the named entity is anonymous.

5. The document anonymization method as set forth in claim 4, wherein the classifying of each named entity that is not a named person as anonymous comprises:
    re-classifying the named entity as anonymous if the named entity is associated with a named person classified as anonymous.

6. The document anonymization method as set forth in claim 1, wherein the syntactic analysis comprises:
    parsing the one or more portions of the document including the named entity using a grammar that includes grammar rules pertaining to a subject matter domain of which the document is a part.

7. The document anonymization method as set forth in claim 1, wherein the classifying comprises:
    classifying a first named entity as anonymous responsive to the first named entity being associated by the analysis with a second named entity classified as anonymous.

8. The document anonymization method as set forth in claim 1, further comprising:
    propagating the classification of a named entity as either anonymous or public to multiple occurrences of the named entity in the document.

9. The document anonymization method as set forth in claim 8, further comprising:
    after the propagating but before the anonymizing, repeating the classifying and propagating to reclassify one or more named entities based on the propagating.

10. A document anonymization processor comprising:
    a tagger that identifies named entities including named persons and other named entities in a document;
    an anonymity classifier that classifies each named entity as either anonymous or public based on analysis of one or more portions of the document containing the named entity, the anonymity classifier including (i) a default classifier that classifies each named person by default as anonymous and each other named entity by default as public, (ii) an analyzer that for each named entity searches for evidence contradicting the classification assigned by the default classifier for the named entity, and (iii) a classifier switcher that switches the classification of a named entity if the analyzer finds evidence contradicting the classification assigned by the default classifier for the named entity;
    a propagator that propagates the classification of a named entity as either anonymous or public to multiple occurrences of the named entity in the document; and
    an anonymized document producer that produces an anonymized document corresponding to the document, in which named entities classified as anonymous are not identified; and
    a display terminal that displays the anonymized document.

11. The document anonymization processor as set forth in claim 10, wherein the analyzer of the anonymity classifier comprises:
    a syntactical processor that generates evidence contradicting the classification assigned by the default analyzer based on parsing of the one or more portions of the document containing the named entity.

12. The document anonymization processor as set forth in claim 11, wherein the analyzer of the anonymity classifier further comprises:
    a local lexical processor cooperating with the syntactical processor generates evidence contradicting the classification assigned by the default analyzer based on both syntactical and lexical analysis of the one or more portions of the document containing the named entity.

13. The document anonymization processor as set forth in claim 10, wherein the analyzer of the anonymity classifier comprises:
    a local lexical processor generates evidence contradicting the classification assigned by the default analyzer based on lexical analysis of the one or more portions of the document containing the named entity.

14. The document anonymization processor as set forth in claim 10, wherein the anonymized document producer substitutes an anonymous pseudonym in the anonymized document for each named entity classified as anonymous.

15. The document anonymization processor as set forth in claim 14, wherein the anonymized document producer substitutes a different anonymous pseudonym in the anonymized document for each different named entity classified as anonymous.

16. The document anonymization processor as set forth in claim 14, further comprising:

a locale information database containing locale-specific anonymous pseudonyms, the anonymized document producer selecting one or more anonymous pseudonyms for substitution from the locale information database that are appropriate to a locale of the document.

17. A document anonymization method comprising:
identifying named entities in a document;
default classifying (i) each named person entity as anonymous and (ii) each named entity that is not a named person as public;
selectively re-classifying named entities based on evidence contained in the document indicating that the default classification is incorrect; and at least on of (i) publishing the document and (ii) displaying the document for human review, the publishing or displaying including anonymizing named entities classified as anonymous after the default classifying and the selective re-classifying.

18. The document anonymization method as set forth in claim 17, further comprising:
propagating a named entity classification to multiple occurrences of the named entity in the document.

19. The document anonymization method as set forth in claim 18, further comprising:
after the propagating, repeating the selective re-classifying for named entities associated with the propagated named entity classification.

20. The document anonymization method as set forth in claim 17, wherein the selective re-classifying comprises:
analyzing at least portions of the document containing named entities in conjunction with a grammar to generate the evidence on which to base the selective reclassifying.

21. The document anonymization method as set forth in claim 17, wherein the selective re-classifying comprises:
parsing at least portions of the document containing named entities based on a grammar to identify links between named entities, the evidence on which to base the selective reclassifying including the identified links between named entities.

22. The document anonymization method as set forth in claim 17, wherein the named person entities include named entities corresponding to personal identification numbers, and the selective re-classifying comprises:
selectively re-classifying named person entities based on evidence contained in the document indicating that the default anonymous classification is incorrect, the selective re-classifying never re-classifying named person entities corresponding to personal identification numbers.

* * * * *